United States Patent Office 3,223,674
Patented Dec. 14, 1965

3,223,674
PROCESS FOR PROMOTING THE CURE OF CLAY-CONTAINING ELASTOMERIC COPOLYMER COMPOSITIONS
Anthony L. Shloss, Wilmington, Del., assignor to E. I. du Pont de Nemours and Company, Wilmington, Del., a corporation of Delaware
No Drawing. Filed July 6, 1962, Ser. No. 208,126
20 Claims. (Cl. 260—41)

This invention relates to a process for promoting the cure of elastomeric copolymers. More particularly this invention relates to a process for promoting the cure of elastomeric copolymers containing clay.

Chain-saturated hydrocarbon copolymers, particularly ethylene/propylene copolymers, are acquiring increasing technical importance today in the manufacture of a wide variety of useful products. For some applications, such as shoe soles and heels and wire and cable coatings, it is desirable that the hydrocarbon copolymer be extended with a large proportion of reinforcing clay filler. Unfortunately, the most inexpensive and economically attractive fillers, the kaolin clays, retard the peroxide curing of these hydrocarbon polymers thus giving unattractive vulcanizates which may even be sponged. The same is true when the more expensive calcined clays are also used as fillers.

It is an object of the present invention to provide an improved process for curing hydrocarbon polymers. It is a further object to provide an improved process for peroxide curing of elastomeric chain-saturated hydrocarbon copolymer stocks containing reinforcing clay. A still further object is to provide an improved process for peroxide curing of elastomeric chain-saturated hydrocarbon copolymer stocks containing a kaolin or calcined clay. Another object is to provide an improved process for peroxide curing ethylene/propylene copolymers containing a kaolin or calcined clay to obtain vulcanizates exhibiting improved stress-strain and electrical properties. Other objects will appear hereinafter.

These and other objects of this invention are accomplished by a process for promoting the di(aralkyl) peroxide cure of elastomeric chain-saturated copolymers of alpha-olefin monomers, said copolymers containing clay, which process comprises masticating at about 250° F. to 500° F., in the absence of said peroxide, about 100 parts by weight of said copolymer, about 20 to 300 parts by weight of kaolin clay or calcined clay and a promoter; introducing said di(aralkyl)peroxide; and heating at about 266° F. to 410° F. so as to effect a cure. The promoter and amount of promoter depend on the clay that is selected. When the clay is kaolin clay, the promoter is present in the amount of about 0.5 to 1.5 parts by weight and the promoter is p-quinone dioxime, morpholine disulfide or mixtures of both. When the clay is calcined clay, the promoter is present in the amount of about 0.1 to 1.5 parts by weight and the promoter is p-quinone dioxime, morpholine disulfide, nitroso amines where the nitrogen atom bearing the —NO radical has no more than one aromatic substituent, poly(para-dinitrosobenzene) and mixtures thereof.

In operating the process for the present invention using a kaolin clay, the copolymer is mixed with kaolin clay and a promoter compound prior to the heat treatment. Although the order of addition is not important, it is essential that both the kaolin clay and the promoter be present during the hot mastication. It was found that when an ethylene/propylene copolymer was heat-treated (hot-masticated) in the presence only of the promoter or a kaolin clay, the composition would not cure satisfactorily. Furthermore, the heat treatment itself is essential. For example, when an ethylene/propylene copolymer is compounded with promoter, kaolin clay, and di(aralkyl)peroxide and subsequently subjected to curing conditions, the resulting vulcanizate is unsatisfactory. Thus when the copolymer is hot masticated in the presence of both the promoter and the kaolin clay, the vulcanizate subsequently obtained after the addition of the di(aralkyl) peroxide and application of heat will display improved modulus, resilience, resistance to compression set, and enhancement in electrical properties such as the direct current resistivity, specific inductive capacitance (di-electric constant), and power factor.

About 0.5 to 1.5 parts by weight of promoter are employed for every 100 parts by weight of copolymer when using a promoter. If less than 0.5 part of promoter is employed, the vulcanizate obtained is not entirely cured. The preferred concentration is about 1 part. When greater amounts are employed, the additional improvement observed is small. Concentrations above 1.5 parts may be employed, but are less economically attractive and are generally unnecessary.

The promoter concentration when calcined clay is used, in general, should be at least about 0.1 phr. (part by weight per 100 parts by weight of polymer). Those skilled in the art can determine by empirical experiments the optimum concentration to use for a particular promoter in a particular copolymer stock. By way of illustration, adequate results are obtained when as little as 0.1 phr. of p-quinone dioxime is employed; at moderately higher concentrations, such as 0.3 and 0.5 phr., slightly better results occur; the preferred concentration is 1 phr. Concentrations of p-quinone dioxime above 1 phr. can be employed but are less economically attractive and are generally unnecessary.

In operating the process of the present invention using calcined clay, the copolymer is mixed with one or more of the above-described promoter compounds, preferably before, but no later than during the hot-mastication. Although the order of addition of the promoter is not important, it is essential that the promoter be present during the mastication. Addition of the calcined clay before, during or after mastication is optional but addition before is preferable, the vulcanizates having somewhat lower compression sets and slightly better stress-strain properties. The addition of calcined clay, unlike that of kaolin clay, can be accomplished after the mastication. Part of the calcined clay can be added before or during mastication and the remainder added upon completion of the mastication.

In addition to the other promoters specifically mentioned above for use with a calcined clay filler, a wide variety of nitrosoamines can be used in the process. These compounds are made by treating secondary amines with nitrous acid in the conventional manner. The molecular weight of the nitrosoamines frequently ranges between 74 and about 210 but is not a critical factor and may be higher. In general the aliphatic nitrosoamines may be open-chain (linear or branched), cyclic (usually 5- or 6-membered rings) or heterocyclic (usually 5- or 6-membered rings containing at least one nitroso-bearing nitrogen atom); ethylenic unsaturation is preferably absent.

The open-chain nitrosoamine can have beta (or more remote) hydroxyl groups; the heterocyclic nitrosoamines can have a beta oxygen atom in the ring. N-alkyl-N-aryl nitrosoamines are also active. The aryl group is preferably a benzene (or substituted benzene) radical but other aromatic radicals such as naphthyl, biphenylyl or anthracyl are suitable.

Representative and preferred nitroso compounds include: N,N'-dinitroso-2,5-dimethyl piperazine; N,N'-dinitroso-2,3,5,6-tetramethyl piperazine; N-methyl-N,4-dinitroso aniline; N-nitroso-diethylamine; N-nitroso-2-pyrrolidone; N-nitroso-morpholine; N,N′,N″-trinitroso-s-triazine; poly(p-dinitrosobenzene); N-nitroso-di-n-butyl-amine; N-nitroso-diisobutylamine; and N-nitroso-dicyclohexylamine.

Generally, 20 to 300 parts by weight of either a kaolin clay or calcined clay are employed for every 100 parts by weight of copolymer. The preferred concentration is 120 parts. Vulcanizate properties tend to fall off as the clay concentration is decreased below this value and when less than 20 parts of clay are employed, the vulcanizate properties will not be satisfactory. It is to be understood that after the heat-treatment has been carried out, the stock can be loaded with still greater amounts of clay for special purposes. It is generally unnecessary to employ more than 300 parts of clay per 100 parts of copolymer during the heat-treatment.

The copolymer, clay, and promoter can be mixed at the temperature selected for the hot mastication. However, is it difficult to achieve good dispersion of the clay filler in a reproducible manner at these high temperatures because the reduced polymer viscosity lessens the shearing action needed for mixing the clay. Thus, it is preferred that the clay, at least, be added to the copolymer at temperatures below 150° F. The best procedure is to mix the three components on a cool rubber roll mill at temperatures between about 75° F. and 100° F. before the hot mastication. The promoter can be added on a hot mill, if desired, by blending it rapidly to provide equal effect on the entire batch. When hot mastication is carried out in a Banbury mixer, the copolymer, clay, and promoter (and optional imperatives such as petroleum oil) are added to the Banbury at the start of the mixing cycle. Since the cooling water is off, the stock temperature reaches 380° F. rapidly and hot mixing and mastication are accomplished after 10 minutes at 380° F. The di(aralkyl)peroxide is subsequently added on a cool mill or a second pass through the Banbury.

In addition to the copolymer, clay, and promoter, other components may be present provided they do not interfere with the hot mastication treatment or the subsequent cure and provided they themselves do not initiate premature curing. A petroleum oil of the hereinafter-described type can be present and may facilitate processing if the copolymer is very tough and difficult to mill and masticate.

The hot mastication is carried out preferably on a two-roll mill or a Banbury mixer for periods of time ranging from about 5 minutes to 30 minutes. The mastication time is not particularly critical, although it is believed that a treatment less than 10 minutes long would give slightly less satisfactory results; there are generally no advantages to hot mastication lasting more than about 10 minutes.

The hot mastication temperature can range from about 250° F. (121.1° C.) to at least 500° F. (260° C.). It has been found that mastication for about 5 minutes at about 250° F. gives borderline results and rather good vulcanizates are obtained when the mastication time at 250° F. is lengthened to 10 minutes. The preferable minimum temperature is 275° F. when using calcined clay. In general, the results improve as the time or temperature, particularly the temperature, is increased. It has been found that hot mastication for 10 minutes at 300° F. or 5 or 10 minutes at 380° F. or 10 minutes at 450° F. (232.3° C.) give essentially the same results. Between 250° F. and 300° F. (148.9° C.) an increase in the temperature or in the time of treatment causes an increase in the effectiveness of the treatment. Between 300° F. (148.9° C.) and 450° F. a performance plateau appears to exist and only a small degree of improvement at most is observed in raising the temperature through this range. Temperatures above 450° F., for example, 500° F. (260° C.) can be employed, if desired, but are unnecessary.

After the hot mastication of the copolymer stock containing the clay and the promoter has been finished, the di(aralkyl)peroxide curing agent is introduced. In order to avoid unmanageable scorch, it is preferred to cool the batch to 250° F., preferably 75–100° F. (23.89–37.78° C.) before this addition.

The elastomeric chain-saturated hydrocarbon copolymers which can be treated according to the improved process of the present invention are the normally solid elastomeric copolymers of at least two α-monoolefins having the structure R—CH=CH$_2$ where R is H or $C_1$–$C_{16}$ alkyl. Representative examples of useful α-monoolefins include: propylene; 1-butene; 4-methyl-1-pentene; 1-pentene; 1-hexene; 1-heptene; 1-octene; 1-decene; 5-mehtyl-1-nonene; 5,5-dimethyl-1-octene; 4-methyl-1-hexene; 4,4-dimethyl-1-pentene; 5-methyl-1-hexene; 4-methyl-1-heptene; 5-methyl-1-heptene; 4,4-dimethyl-1-hexene; 5,6,6-trimethyl-1-heptene; 1-dodecene; and 1-octadecene.

Representative copolymers include: ethylene/propylene, which is preferred; ethyelne/1-butene; propylene/1-butene; ethylene/5,5-dimethyl-1-octene; 1-hexene/1-decene; ethylene/propylene/1 - octadecene; propylene/5-methyl-1-heptene; and 1-hexene/1-dodecene. The preferred copolymers are ethylene/propylene copolymers having from about 10–90 mole percent ethylene monomer units.

The copolymers used in the present invention can be prepared by continuous, or by batch processes, with catalysts made by mixing compounds of the transition heavy metals of Group IV, V and VI (beginning with titanium, vanadium and chromium) with organometallic compounds, hydrides and free metals of Groups I, II and III. The IV–VI Group compounds are preferably halides, oxyhalides, and alkoxides, the preferred metals being titanium and vanadium. Representative compounds are titanium tetrachloride, vanadium oxytrichloride, vanadium tetrachloride and vanadium tris(ocetylacetonate). The I–III metals are preferably lithium, sodium, magnesium and aluminum and the organic portions are preferably alkyl radicals. In these organometallic compounds the valences of the metal may be partly satisfied by halogen or alkoxyl, provided, of course, that at least one bond connects the metal with an organic radical. Representative compounds include diisobutyl aluminum chloride, triisobutyl aluminum, and lithium aluminum tetradecyl. Mixtures may often be used. These catalysts are, of course, not the subject of the present invention. They are more particularly described in Chapter VII of Linear and Steroregular Addition Polymers, N. G. Gaylord and H. F. Mark, Interscience Publishers, Inc., New York, 1959.

As is well known, these catalysts must be used in strict absence of carbon monoxide, oxygen, water or other materials with which they react, and for this reason the solvents in which they are used are limited, the preferred ones being volatile saturated aliphatic hydrocarbons, such as pentane or cyclohexane, and certain non-reactive halogen compounds such as tetrachloroethylene. These solvents conveniently serve as liquid media for the polymerization of the olefins, which is usually carried out in a dilute suspension of the catalyst. The polymerization normally will be carried out at ordinary temperatures, although temperatures as low as −30° C. or as high as 75° C. can be used if desired. The rate of the reaction may be increased by the use of increased pressures, for instance, up to 1000 atmospheres or above; sub-atmospheric pressure can be used, alternatively.

The above copolymers and processes for their preparation are more particularly described in the following references: Natta et al., Chimica e industria (Milan) 39, 733, 743, 825 (1957); ibid, 41, 764 (1959); British Patent 810,023; Australian application 24,034/56; U.S. Patent 3,000,867; U.S. Patent 2,824,090; U.S. Patent 2,820,778; French Patent 1,212,547; Australian application 18,647/56; Australian application 17,773/56; Australian application 44,016/58; British Patent 857,183; Canadian Patent 635,983. Other references may be found in Linear and Steroregular Addition Polymers, mentioned above.

Chain-saturated hydrocarbon polymers having sidechain carbon-carbon double bonds may also be treated according to the improved process of the present invention although it is, generally, more economical and preferable to use a conventional sulfur cure for these materials. Representative examples of these other polymers include the normally solid copolymers of ethylene, at least one non-conjugated hydrocarbon diene, and optionally, at least one α-monoolefin as defined above. The representative dienes include dicyclopentadiene; an aliphatic diene having the structure

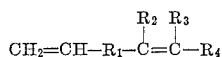

wherein $R_1$ is an alkylene radical, $R_2$ and $R_3$ are independently selected from the group consisting of hydrogen and alkyl radicals, and $R_4$ is an alkyl radical and wherein $R_1$ to $R_4$ are so selected that the diene has from about 6–22 carbon atoms; a 5-alkenyl-substituted-2-norbornene; 5-methylene-2-norbornene; and 2-alkyl-2,5-norbornadienes.

Represenattive copolymers of at least one alpha monoolefin and 5-methylene-2-norbornene include ethylene/propylene/5-methylene-2-norbornene; ethylene/1-butene/5 - methylene - 2-norbornene; ethylene/1-pentadecene/5-methylene-2-norbornene; ethylene/5,5-dimethyl-1-octene/5-methylene-2-norbornene; ethylene/4,4-dimethyl-1-pentene/5-methylene-2-norbornene; ethylene/5,6,6-trimethyl-1-heptene/5-methylene-2-norbornene. In general, it is preferred that these copolymers have an iodine number between 5 and 60 and contain at least about 20 percent ethylene monomer units by weight and at least about 25 percent of other alpha olefin monomer units by weight.

To obtain 5-methylene-2-norbornene, allene having the formula $H_2C=C=CH_2$ is heated in the absence of a polymerization initiator wtih cyclopentadiene. Preferably the reaction is carried out at a temperature of 175–225° C. and still more preferably about 200° C. and in the presence of an addiiton polymerization inhibitor. The broad temperature operating range is generally between about 150° and 250° C. The pressure under which this reaction is carried out is not critical. Good results are obtained when the reactants are heated in a closed container under the autogenous pressure developed by the reactants under the operating conditions. The reaction vessel can be constructed of any material which is inert to the reactants and is capable of withstanding the operating pressures. Reaction vessels made of glass, stainless steel and glass-lined steel are quite satisfactory. The reaction time can be varied widely. Times ranging from 2 to 24 hours or more at 150° C. to 250° C. are operable. Very good results are obtained in reaction periods ranging from 4 to 16 hours. Reactants which are commercially available in the grades used for polymerization are satisfactory for use in making 5-methylene-2-norbornene. However, best results are obtained when the allene is relatively pure.

Representative examples of at least one alpha monoolefin and a 5-alkenyl-2-norbornene include ethylene/propylene/5-(2'-butenyl)-2-norbornene; ethylene/propylene/5-(2'-ethyl-2'-butenyl) - 2 - norbornene; ethylene/propylene/5-(2'-ethyl-1'-butenyl)-2 - norbornene; ethylene/propylene/5-(1'-propenyl)-2-norbornene; ethylene/1-butene/5-(2'-heptyl-1'-undecenyl) - 2 - norbornene; ethylene/1-butene/5-(2'-butenyl)-2 - norbornene; ethylene/1-butene/5-(2'-ethyl-2'-butenyl)-2 - norbornene; ethylene/4,4 - dimethyl-1-hexene/5-(2'-propyl-2'-pentenyl)-2 - norbornene; ethylene/5,5-dimethyl-1-octene/5-(2'-nonyl - 2' - heptenyl)-2-norbornene; ethylene/6-methyl-1 - heptene/5 - (2'-methyl-2'-decenyl)-2-norbornene; ethylene/1 - decene/5-(2'-hexyl-2'-butenyl)-2-norbornene; and ethylene/5,6,6-trimethyl-1-heptene/5-(2'-octyl-2'-butenyl) - 2 - norbornene. It is preferred that these copolymers have an iodine number of between 5 and 60 and contain at least 20 percent ethylene monomer units by weight and at least about 25 percent of other alpha olefin monomer units by weight.

The 5-alkenyl-2-norbornenes may be described by the following formula

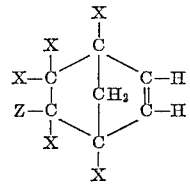

wherein each X represents hydrogen or a monovalent alkyl radical of from 1 to 6 carbon atoms; Z represents a monovalent alkenyl radical, the carbon-to-carbon double bond therein being internal.

A wide variety of 5-alkenyl-2-norbornenes can be made for use in the present invention by the Diels-Alder addition of both conjugated and non-conjugated hydrocarbon dienes to cyclopentadienes having the formula

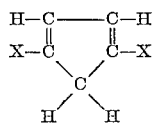

in which X is as heretofore described; the X's can be the same or different. The reaction is carried out at autogenous pressure in a closed inert (e.g. glass and stainless steel) container at temperatures ranging between about 150 to 250° C., preferably 175–225° C., for times ranging between about 2 and 24 hours. It is preferred that an addition polymerization inhibitor (e.g. hydroquinone) be present. Representative syntheses of this type are: the formation of 5-(2'-butenyl)-2-norbornene from cyclopentadiene and 1,4-hexadiene; the preparation of 5-(1'-propenyl)-2-norbornene from cyclopentadiene and 1,3-pentadiene (often called piperylene).

The reaction of cyclopentadiene with conjugated dienes having the structure X'—CH=CH—CH=CH—X", where X' and X" are alkyl radicals, can be used to prepare 6-alkyl-5-alkenyl-2-norbornenes having the structures

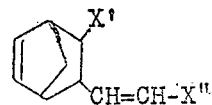

and a

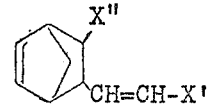

The reaction of cyclopentadiene with conjugated dienes of formula $CH_2=CH—CH=CH—Q$, where Q is an alkyl radical, will produce

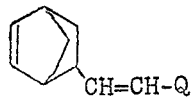

The reaction of cyclopentadiene with unsymmetrical nonconjugated dienes of the structure

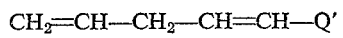

where Q' is an alkyl radical will lead to 5-(2'-alkenyl)-2-norbornenes

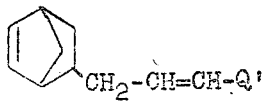

The 2-norbornenes having the structures

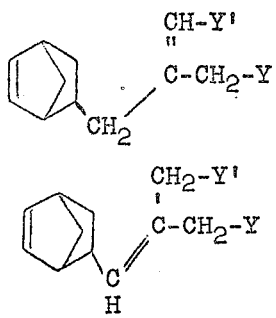

where Y is H or alkyl and Y' is alkyl, are made by reacting the Grignard reagent of 5-bromomethyl-2-norbornene in ether with ketones having the structure

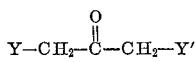

and dehydrating the resulting tertiary carbinol in refluxing toluene in the presence of anhydrous copper sulfate. The preparation of 5-(2'-ethyl-2'-butenyl)-2-norbornene from diethyl ketone is typical.

Representative examples of at least one alpha monoolefin and a 2-alkyl-2,5-norbornadiene include ethylene/propylene/2-methyl-2,5-norbornadiene; ethylene/propylene/2-ethyl-2,5 - norbornadiene; ethylene/1 - butene/2-methyl-2,5-norbornadiene; ethylene/1 - hexene/2 - ethyl-2,5-norbornadiene; ethylene/1-decene/2-butyl - 2,5 - norbornadiene; and ethylene/1-heptene/2-octyl-2,5-norbornadiene. It is preferred that these copolymers have an iodine number of between 5 and 60 and contain from about 20 to 72.5 percent by weight of ethylene monomer units 25, to 77.5 percent by weight of other alpha monoolefin monomer units and not more than about 20 percent by weight of norbornadiene monomer units.

The 2-alkyl-2,5-norbornadienes can be described by the following structural formula

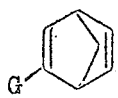

where G is a $C_1$–$C_8$ alkyl radical. These dienes are made by heating acetylenes having the formula G—C≡C—H, where G is a $C_1$–$C_8$ alkyl radical, with cyclopentadiene at 175–225° C. in the absence of a polymerization initiator. Closed reaction vessels made from stainless steel or glass-lined steel are satisfactory.

The chain-saturated copolymers having side chain carbon to carbon double bonds may be prepared by a wide variety of procedures. U.S. Patent 2,933,480 describes the preparation of one of the preferred classes of copolymers such as the ethylene/propylene/1,4-hexadiene copolymers having up to 40 mole percent of diene. The preparation of ethylene/propylene/dicyclopentadiene copolymers is described in U.S. Patent 3,000,866. The other copolymers can be prepared by contacting at least one alpha monoolefin as described and at least one nonconjugated diene as described in solution in tetrachloroethylene with specific coordination catalysts as hereinafter described at temperatures between —30° C. and 100° C. at atmospheric, subatmospheric, or superatmospheric pressure, oxygen, water vapor, carbon monoxide, carbon dioxide and organic compounds bearing Zerewitinoff active hydrogen atoms being absent. Coordination catalsts useful for preparing the copolymers are made by mixing vanadium tetrachloride, vanadium tris(acetylacetonate), or vanadium oxytrichloride (also called vanadyl chloride) with a reducing compound having the structure $R_3Al$ or $(R)_2AlX$ where R is $C_1$–$C_{12}$ alkyl (such as ethyl, isobutyl, octyl, or dodecyl) and X is a chlorine atom or bromine atom; the preferred organoaluminum compound is diisobutyl aluminum chloride. The relative proportions of the aluminum compound and the vanadium compound are frequently selected so that the molar ratio of Al:V is at least about 1.5:1. Those skilled in the art can determine the best proportion to use with a particular set of catalyst components. Thus, when aluminum triisobutyl or diisobutyl aluminum chloride is employed with $VOCl_3$, the value of the molar ratio aluminum:vanadium preferably ranges beteween 1.5:1 and 2.5:1. Similar proportions are employed when the aluminum compound is made by reacting triisobutyl aluminum with aluminum chloride. The Al:V molar ratio value may be higher than 2.5:1 when desired (e.g. 10:1) When vanadium tris(acetylacetonate) is employed, the preferred value of the Al:V molar ratio ranges from about 4:1 to 10:1. The preferred concentration of the vanadium salts in the polymerization reaction zone is about 0.005 to 0.0005 molar; however, higher or lower concentrations can be employed. The catalyst may be premixed or it may be formed in situ in the reaction zone. Liquid paraffins and cycloparaffins such as neopentane, cyclohexane, and 2,2,4-dimethylpentane, can be used as solvents in place of tetrachloroethylene. In place of the solution processes described above, the copolymers can be prepared in slurry form by reacating the monomers in methylene chloride at —30° to +40° C.; with the proviso that the total concentration of copolymerizable monomers shall not exceed 5 molar. The preferred catalyst systems are made by reacting vanadium tris(acetylacetonate) with an organoaluminum compouned selected from the group consisting of diisobutyl aluminum chloride, diisobutyl aluminum bromide, the reaction product of 2.0 moles of aluminum bromide with 1.0 mole of triisobutyl aluminum and the reaction product of 2.0 moles of aluminum chloride with 1.0 mole of triisobutyl aluminum, the proportions of catalyst components being so selected that the molar ratio of isobutyl radicals to vanadium atoms is at least 6:1 and the vanadium concentration in the system is 0.001 molar to 0.1 molar. Suitable vanadium catalysts are described in U.S. Patent 2,962,451.

Any kaolin clay which is conventionally used for reinforcing elastomers can be employed in the present invention. In general, these clays have particle sizes in the range of 2 microns. The finer the particle size, the better the filler responds in the improved process of the present invention. It is not critical whether these kaolin clays are "residual" or "sedimentary" in origin, they can be produced by any conventional process such as the dry process (air floatation) or the wet process (classification in a water suspension). These clays are the clay minerals belonging to the kaolin group and have a non-expanding crystal lattice in which one gibbsite sheet is condensed with one silica sheet. Representative minerals include kaolinite, the most important one, nacrite, dickite, and halloysite. Kaolinite has the chemical formula $$Al_2O_3 \cdot 2SiO_2 \cdot 2H_2O.$$

It is to be understood that these kaolins generally also contain some compounds of iron, titanium, calcium, magnesium, potassium, sodium, and occasionally manganese. Minor proportions of hydrated aluminum silicate minerals other than kaolinite may be present in kaolinite clays. In general, the molar ratio of silica to alumina is in the neighborhood of 2:1, the value of kaolinite itself.

The principal physical characteristcis of the kaolin clays which are preferred for use in the present invention are: (1) a specific gravity of about 2.60; (2) a 325-mesh screen residue below about 3.5%, preferably below about 0.35%; (3) absorbed moisture content between about 0 to 1%; (4) a particle size distribution wherein at least about 55% by weight of the particles are two microns or less in diameter; and (5) a pH (in water) of about 4.4 to 7.0, although specifically prepared and treated clays may show pH values of 8.0 or higher.

The following data illustrate the properties of representative useful kaolin clays:

KAOLIN CLAYS

| Type | Hard [1] A.F. | Hard A.F. | Soft A.F. | Soft A.F. | Soft A.F. | Soft [2] W.F. |
|---|---|---|---|---|---|---|
| Process |  |  |  |  |  |  |
| Specific Gravity | 2.60 | 2.60 | 2.60 | 2.60 | 2.60 | 2.60 |
| 325 Mesh Residue (percent) | 0.17 | 0.03 | 0.30 | 0.05 | 0.30 | 0.02 |
| Max. Moisture (percent) | 1.0 | 1.0 | 1.0 | 1.0 | 1.0 | 1.0 |
| Particle Size Distr.: |  |  |  |  |  |  |
| >10μ | 0.1 | 0.1 | 8.3 | 8.3 | 6.6 | 1.2 |
| 5–10μ | 2.8 | 2.8 | 12.4 | 12.4 | 9.2 | 8.2 |
| 4–5μ | 1.5 | 1.5 | 4.5 | 4.5 | 4.2 | 4.2 |
| 3–4μ | 2.3 | 2.3 | 6.3 | 6.3 | 5.7 | 6.5 |
| 2–3μ | 3.4 | 3.4 | 8.6 | 8.6 | 8.9 | 9.4 |
| 1.2μ | 9.0 | 9.0 | 17.1 | 17.1 | 18.4 | 15.5 |
| 0.5–1μ | 19.0 | 19.0 | 17.2 | 17.2 | 16.2 | 16.0 |
| 0–0.5μ | 61.9 | 61.9 | 25.1 | 25.1 | 30.8 | 39.0 |
| >5μ | 2.9 | 2.9 | 20.7 | 20.7 | 15.8 | 9.4 |
| <2μ | 89.9 | 89.9 | 59.4 | 59.4 | 65.4 | 70.5 |
| pH (water) | 4.4–5.5 | 4.4–5.5 | 4.4–5.5 | 4.4–5.5 | 6.0–7.0 | 4.4–5.5 |

[1] A.F.=air floated.
[2] W.F.=water fractionated.

Representative "hard" and "soft" kaolins contain (by weight): 44–46% silica; 37.5–39.5% alumina; 0.5–2.0 iron oxide; and 1–2% titanium dioxide The ignition loss of the representative clays is 13.9–14.7% by weight.

Clays are more particularly described in the following publications: Compounding Ingredients for Rubbers, Third Edition, 161 Cuneo Press of New England, Cambridge, Mass., compiled by the Editors of Rubber World, 630 Third Avenue, New York 17, New York; Kaolin Clays and Their Industrial Uses, J. M. Huber Corp., New York, New York, Second Edition, 1955; India Rubber World, vol. 118, No. 6, New York, September 1948, pages 793–795; Clays, Their Occurrence, Properties and Uses, H. Ries, Third Edition, John Wiley & Sons, Inc., New York, 1927; The Chemistry and Physics of Clays and Other Ceramic Materials, A. B. Searle and R. W. Grimshaw, Third Edition, Interscience Publishers, Inc., New York, 1959; Preliminary Reports Reference Clay Materials, American Petroleum Institute Research Project 49, Columbia University, New York, January 1951; and X-Ray Identification and Crystal Structures of Clay Materials, edited by G. W. Brindley, London, 1951.

Representative commercially available kaolin clays include: Champion Clay ("hard"), Crown Clay ("hard"), Harwick Clay No. 1 ("hard"), Suprex Clay ("hard"), Alumex R ("soft"), "Hi-White R" ("soft"), McNamee Clay ("soft"), Paragon Clay ("soft"), and Polyfil F ("soft").

The calcined clays used in this invention are made by thermally treating a pure kaolin to remove the interconnecting OH groups in the stacked structure of the platelets. This thermal treatment can be carried out at various temperatures for various lengths of time; the clay fed in the thermal process can be of varying particle size distribution. Although the resulting material is called generically as calcined clay, it is often considered more accurate to say that the calcined clay is a complex aluminum silicate. The calcined clay is said to be amorphous as far as X-ray diffraction is concerned.

Representative calcined clays exhibit the following properties:

| Specific gravity | 2.55 | 2.68 | 2.68 |
|---|---|---|---|
| Max. Percent Moisture | 0.5 | 0.5 | 0.5 |
| 325 Mesh Residue (percent) | 0.5 | 0.5 | 0.5 |
| Particle Size Distr. (percent by wt.): |  |  |  |
| <2 | 38 | 50 | 70 |
| >5 | 31 | 8 | 5 |
| Ignition Loss (percent) | <3 | <1 | <1 |
| pH (water) | 5.5–6.2 | 5.5–6.2 | 5.5–6.2 |

They contain (by weight): 54% silica; 43.75% alumina; 0.25% iron oxide; and 0.75% titanium dioxide.

Representative commercial calcined clays are described in Compounding Ingredients for Rubber, mentioned above. Iceberg Pigment and Polyfil 70 are typical useful commercial products.

The peroxides which are useful in curing the copolymers which have been heat-treated (hot masticated) according to the present invention are di(aralkyl) peroxides of the formula

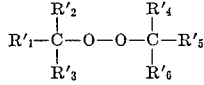

where $R'_1$ and $R'_6$ are aryl and $R'_2$, $R'_3$, $R'_4$, and $R'_5$ are H or $C_1$–$C_3$ alkyl. The preferred peroxide is bis(α,α-dimethylbenzyl) peroxide, which is sometimes called dicumyl peroxide. These peroxides are more particularly described in U.S. Patent 2,983,714. In general, about 1 part to 10 parts by weight of dicumyl peroxide is used for every 100 parts by weight of hydrocarbon copolymer. The preferred concentration ranges between about 2 and 5 parts. Three parts of dicumyl peroxide is particularly preferred. Lower stress-strain and less desirable electrical properties are obtained when the proportion of peroxide is decreased, other conditions being held constant. The vulcanizates made with 1 part per hundred of dicumyl peroxide are not as satisfactory as those made with greater proportions. It is generally both unnecessary and uneconomical to introduce more than 10 parts of dicumyl peroxide. The electrical and the stress-strain properties of the vulcanizates made from stocks containing two and three parts of dicumyl peroxide are approximately equivalent; however, the latter vulcanizates exhibited lower compression set and greater resilience.

Those skilled in the art can empirically determine the optimum concentration of a particular peroxide for a specific copolymer composition. A small amount of sulfur may also be added before curing to promote the curing of the composition. The sulfur addition is optional but is preferable.

The following examples will better illustrate the nature of the present invention; however, the invention is not intended to be limited to these examples. Parts are by weight unless otherwise indicated.

EXAMPLE 1

A. The compounding ingredients are:

(1) *Ethylene/propylene copolymer*

The ethylene/propylene copolymer contained 68% propylene monomer units by weight and exhibited an inherent viscosity of 2.14 (0.1% by weight solution in tetrachloroethylene at 30° C.).

(2) *Suprex Clay*

Suprex Clay is an air-floated "hard" kaolin clay containing 44–46% silica, 37.5–39.5% alumina, 1.5–2.0% iron oxide, and 1–2% titanium dioxide by weight, the ignition loss being 13.9–14.2% by weight. The maximum moisture content is 1.0% by weight. The pH (in water) is 4.5–5.5. This clay has a specific gravity of 2.60, a 325-mesh screen residue of 0.17% by weight, and the following particle size distribution (by weight): >10μ, 0.1%; 5–10μ, 2.8%; 4–5μ, 1.5%; 3–4μ, 2.3%; 2–3μ, 3.4%; 1–2μ, 9.0%; 0.5–1μ, 19.0%; 0–0.5μ, 61.9%.

(3) *p-Quinone dioxime*

B. Heat treatment:

Three stocks 1A, 1B, and 1C were compounded on a rubber roll mill at a temperature between 75° F. and 100° F. according to the following recipes given as parts by weight:

| Ingredient | 1A | 1B | 1C |
|---|---|---|---|
| Ethylene/Propylene Copolymer | 100 | 100 | 100 |
| Suprex Clay | 120 | 120 | 0 |
| p-Quinone Dioxime | 1 | 0 | 1 |

Stocks No. 1A, 1B, and 1C were then masticated on a hot 2-roll mill for 10 minutes at 380° F. and allowed to cool to 75–100° F. Then stock 1C was mixed with 120 parts of Suprex Clay and all the stocks were further compounded at 75–100° F. on the rubber roll mill with 0.2 part of sulfur and 7.5 parts of a mixture containing 40% by weight dicumyl peroxide and 60% by weight calcium carbonate. The stocks thereby obtained were heated at 307° F. for 30 minutes. The following data were obtained at 25° C. for the resulting compositions: Stocks 1B and 1C are included for comparison.

VULCANIZATE DATA OF STOCKS MASTICATED AT 380° F.

| | 1A | 1B | 1C |
|---|---|---|---|
| During heat-treatment: | | | |
| Polymer present | Yes | No | Yes |
| Clay present | Yes | Yes | No |
| 300% Modulus (p.s.i.) | 875 | No cure | No cure |
| Tensile Strength (p.s.i.) | 1,000 | | |
| Elongation at break (percent) | 500 | | |
| Yerzley resilience (percent) | 58.5 | | |

These data show that the kaolin clay and the promoter must both be heat-treated.

EXAMPLE 2

A. Five stocks 2A–2E were compounded on a rubber roll mill at a temperature between 75° F. and 100° F. according to the following general recipe:

Ingredients: Parts by weight
Ethylene/propylene copolymer (of Example 1) 100
Suprex Clay 120
p-Quinone dioxime 1

Stocks 2B–2E were then masticated on a hot 2-roll mill for various times and temperatures described hereafter in the table below. After the stocks 2B–2E had cooled to 75–100° F., all the stocks were further compounded on a rubber roll mill at 75–100° F. with 0.2 part of sulfur and 7.5 parts of the 40% dicumyl peroxide and 60% by weight calcium carbonate mixture. The stocks were then heated at 307° F. for 30 minutes. The following data were obtained at 25° C. Stock 2A is included for comparison.

VULCANIZATE PROPERTIES OF CLAY STOCKS CONTAINING PROMOTER

| | 2A | 2C | 2B | 2D | 2E |
|---|---|---|---|---|---|
| Heat Treating Conditions (mins./° F.) | None | 10/300 | 5/380 | 10/380 | 10/450 |
| 200% Modulus (p.s.i.) | No cure | 825 | 850 | 900 | 925 |
| Tensile Strength (p.s.i.) | | 1,050 | 1,100 | 1,100 | 1,100 |
| Elongation at Break (percent) | | 470 | 480 | 430 | 340 |

B. Six stocks 2F–2K were each compounded with Suprex Clay and p-quinone dioxime according to the recipe of Part A and thereafter masticated according to the times and temperatures given in the table below. Stocks 2F and 2G were given for comparison when the masticating temperature is too low. After the stocks had been allowed to cool to 75–100° F., they were further compounded with sulfur and the 40% dicumyl peroxide mixture according to the recipe of Part A. The stocks, after being heated for 30 minutes at 307° F., exhibited the following properties at 25° C.:

| | 2F | 2G | 2H | 2I | 2J | 2K |
|---|---|---|---|---|---|---|
| Heat treating conditions (mins./° F.) | 5/200 | 10/200 | 5/250 | 10/250 | 5/300 | 10/300 |
| 300% Modulus (p.s.i.) | 375 | 500 | 600 | 775 | 850 | 900 |
| Tensile Strength (p.s.i.) | 475 | 575 | 700 | 900 | 975 | 1,000 |
| Elongation at Break (percent) | 600 | 590 | 540 | 530 | 540 | 450 |

These data support preferred time and temperature limits and show that even when a promoter is present clay filled stock will not cure in the absence of a heat treatment.

EXAMPLE 3

A. The following ethylene/propylene copolymers were used. Copolymer I which contains 58±5 mole percent ethylene monomer units, exhibits a Mooney viscosity (ML–4) of 35–49 at 212° F. (8 minutes), and has a specific gravity of 0.86 gram per cubic centimeter.

Copolymer II which is the same as described in Example 1.

Copolymer III which contains 33% by weight propylene monomer units, exhibits a Mooney (ML–4) viscosity of 22 at 212° F. and an inherent viscosity of 1.50 (0.1% by weight solution in tetrachloroethylene at 30° C.).

B. Three stocks 3A–3C were compounded on a rubber roll mill according to the following recipes:

| Ingredients | Copolymer II 3A | Copolymer III 3B | Copolymer I 3C |
|---|---|---|---|
| Ethylene/propylene Copolymer | 100 | 100 | 100 |
| Suprex Clay | 120 | 120 | 120 |
| p-Quinone Dioxime | 1 | 1 | 1 |
| Sulfur | 0.2 | 0.2 | 0.2 |
| Dicumyl Peroxide (40% Active) | 7.5 | 7.5 | 7.5 |

After the clay and promoter were added to the copolymer at a temperature between 75° F. and 100° F., the three stocks were masticated for 10 minutes at 380° F. Thereafter the stocks were allowed to cool to 75–100° F. and were compounded with sulfur and dicumyl peroxide in the amounts given above. The stocks were then cured for 30 minutes at 307° F. and the vulcanizates obtained exhibited the following properties at 25° C.

VULCANIZATE PROPERTIES OF STOCKS HEAT TREATED AT 380° F.

|  | Copolymer II 3A | Copolymer III 3B | Copolymer I 3C |
|---|---|---|---|
| 300% Modulus (p.s.i.) | 1,000 | 1,090 | 960 |
| Tensile Strength (p.s.i.) | 1,080 | 1,180 | 1,330 |
| Elongation (percent) | 450 | 380 | 640 |

Stocks were also press cured for 10 seconds at 225 lbs. per square inch steam pressure. The vulcanizates obtained exhibited the following properties at 25° C.:

|  | Copolymer II 3A | Copolymer III 3B | Copolymer I 3C |
|---|---|---|---|
| 300% Modulus (p.s.i.) | 930 | 1,120 | 750 |
| Tensile Strength (p.s.i.) | 1,030 | 1,340 | 1,250 |
| Elongation (percent) | 460 | 610 | 800 |

Three more stocks 3D–3F were prepared following a procedure not within the definition of this invention. They are offered to show the necessity of the hot-mastication step of the present invention. The three stocks were compounded on a rubber roll mill at a temeprature between 75° F. and 100° F. according to the following recipes (the hot-mastication step was omitted):

|  | Copolymer I 3D | Copolymer II 3E | Copolymer III 3F |
|---|---|---|---|
| Ethylene/propylene Copolymer | 100 | 100 | 100 |
| Suprex Clay | 120 | 120 | 120 |
| p-Quinone Dioxime | 1 | 1 | 1 |
| Sulfur | 0.2 | 0.2 | 0.2 |
| Dicumyl Peroxide (40% Active) | 7.5 | 7.5 | 7.5 |

After compounding the above stocks were heated at 307° F. for 30 minutes and they remained uncured and were badly sponged.

These data show that all the ethylene/propylene copolymers containing clay will not cure even though a promoter is present. The similar behavior of all the stocks shows that the problem is not peculiar to copolymer II on which much of the data for this invention were obtained.

EXAMPLE 4

A. Ethylene/propylene copolymer:
The ethylene/propylene copolymer of Example 1 was used.

B. Heat treatment and cure:
Six stocks 4A–4F were compounded on a rubber roll mill at a temperature between 75° and 100° F. according to the following general recipe:

Ingredient: Parts by weight
Ethylene/propylene copolymer _____ 100
Suprex Clay _____ 120
Promoter _____ as shown in table Promoters other than p-quinone dioxime and morpholine disulfide are included for comparison. After these stocks had been masticated on a 2-roll mill for 10 minutes at 380° F., they were cooled to 75–100° F. and further compounded at 75–100° F. with 0.2 part of sulfur and 7.5 parts of a mixture containing 40% by weight dicumyl peroxide and 60% by weight calcium carbonate. The stocks were then vulcanized at 307° F. for 30 minutes. Only the stocks containing p-quinone dioxime or morpholine disulfide cured. The following data were obtained at 25° C.:

VULCANIZATE PROPERTIES OF STOCKS HEAT TREATED AT 380° F.

| Promoter | 4A | 4B | 4C | 4D | 4E | 4F |
|---|---|---|---|---|---|---|
| p-Quinone dioxime | 1 | 0 | 0 | 0 | 0 | 0 |
| Poly(p-dinitrosobenzene) | 0 | 1 | 0 | 0 | 0 | 0 |
| N,4-dinitroso-N-methylaniline | 0 | 0 | 1 | 0 | 0 | 0 |
| Morpholine disulfide | 0 | 0 | 0 | 1 | 0 | 0 |
| Hexachloromelamine | 0 | 0 | 0 | 0 | 1 | 0 |
| Sulfur | 0 | 0 | 0 | 0 | 0 | 1 |
| 300% Modulus (p.s.i.) | 950 | (1) | (1) | 625 | (1) | (1) |
| Tensile Strength (p.s.i.) | 1,050 |  |  | 1,150 |  |  |
| Extension at Break (percent) | 420 |  |  | 730 |  |  |

1 No cure.

EXAMPLE 5

A. Ethylene/propylene copolymer:
The ethylene/propylene copolymer of Example 1 was used.

B. Heat treatment and cure:
Three stocks 5A–5C were compounded on a rubber roll mill at a temperature between 75 and 100° F. according to the following general recipe:

Ingredient: Parts by weight
Ethylene/propylene copolymer _____ 100
Suprex Clay _____ 120
p-Quinone dioxime _____ 1

After these stocks had been masticated on a hot 2-roll mill for 10 minutes at 380° F., they were cooled to 75–100° F. and further compounded on a rubber roll mill at 75–100° F. with 0.2 part of sulfur and the part by weight, described in the table below, of a mixture containing by weight 40% dicumyl peroxide and 60% calcium carbonate. The stocks were then vulcanized at 307° F. for 30 minutes. The following data were obtained:

VULCANIZATE PROPERTIES OF HEAT TREATED STOCKS CURED WITH DIFFERENT PROPORTIONS OF DICUMYL PEROXIDE

| Dicumyl Peroxide* (phr.) | 5A 1.0 | 5B 2.0 | 5C 3.0 |
|---|---|---|---|
| Modulus at 100% Extension (p.s.i.), 25° C | 260 | 425 | 500 |
| Modulus at 200% Extension (p.s.i.), 25° C | 450 | 800 | 850 |
| Modulus at 300% Extension (p.s.i.), 25° C | 600 | 950 | 1,000 |
| Tensile Strength (p.s.i.), 25° C | 650 | 1,000 | 1,050 |
| Extension at the Break (percent), 25° C | 400 | 450 | 440 |
| Yerzley Resilience (percent), 25° C | 52 | 56 | 60 |
| Yerzley Resilience (percent), 100° C | 44 | 57 | 63 |
| Compression Set (percent), 25° C | 93 | 68 | 49 |

* Active ingredient.

EXAMPLE 6

*Iceberg Pigment*

Iceberg Pigment is a calcined kaolin clay containing 45–52% silica and 38–44% alumina and having an ignition loss of 0%. Its specific gravity is 2.63.

Three stocks 6A–6C were compounded and treated according to the procedure of Example 1 except that a calcined clay ("Iceberg Pigment") was substituted for the kaolin clay ("Suprex Clay"). Stocks 6A, 6B, and 6C of this example correspond respectively to stocks 1A, 1B, and 1C of Example 1. The following data was obtained at 25° C. for the following compositions. Stock 6B is included for comparison.

VULCANIZATE DATA OF STOCKS MASTICATED AT 383° F.

|  | 6B | 6C | 6A |
|---|---|---|---|
| During Hot Mastication: |  |  |  |
| Promoter present | No | Yes | Yes |
| Clay present | Yes | No | Yes |
| 300% Modulus (p.s.i.) | No cure | 600 | 800 |
| Tensile strength (p.s.i.) |  | 650 | 825 |
| Elongation at break (percent) |  | 400 | 400 |
| Yerzley resilience (percent) |  | 57 | 59.5 |
| Compression set (percent) |  | 52 | 32 |

EXAMPLE 7

Four stocks 7A–7D were each compounded with calcined clay ("Iceberg Pigment") on a rubber roll mill at a temperature between 75° F. and 100° F. according to the following general recipe:

Ingredient: Parts by weight
Ethylene/propylene copolymer (of Example 1) _____ 100
Iceberg Pigment _____ 120
p-Quinone dioxime _____ 1

Stocks 7B–7D were then masticated for 10 minutes at the temperature given in the table below. After they had been allowed to cool to 75–100° F., they were further compounded (as was stock 7A) with 0.2 part of sulfur and 7.5 parts of a mixture containing 40% by weight dicumyl peroxide and 60% calcium carbonate. Vulcanizates, obtained by a 30-minute cure at 307° F., exhibited the following properties at 25° C. Stocks 7A and 7B are included for comparison.

VULCANIZATE PROPERTIES, PROMOTER ADDED BEFORE HEAT TREATMENT

|  | 7A | 7B | 7C | 7D |
|---|---|---|---|---|
| Heat Treating Conditions (mins./° F.) | None | 10/200 | 10/250 | 10/300 |
| 300% Modulus (p.s.i.) | 500 | 550 | 600 | 725 |
| Tensile Strength (p.s.i.) | 600 | 625 | 675 | 800 |
| Elongation at Break (percent) | 590 | 580 | 550 | 470 |

EXAMPLE 8

Two stocks 8A–8B were compounded on a rubber roll mill at 75–100° C. according to the following recipe:

Parts by weight
Ethylene/propylene copolymer (copolymer III of Example 5) _____ 100
Calcined clay ("Iceberg Pigment") _____ 120
p-Quinone dioxime _____ 1

Stock 8B was then masticated at 380° F. for 10 minutes and allowed to cool to 75–100° F. After both stocks had been compounded with 0.2 part of sulfur and 7.5 parts of a mixture containing 40% by weight dicumyl peroxide and 60% calcium carbonate, they were cured at 307° F. for 30 minutes. The vulcanizates obtained exhibited the following properties at 25° C. Stock 8A is included for comparison.

VULCANIZATE PROPERTIES. PROMOTER ADDED BEFORE HEAT TREATMENT

|  | 8A | 8B |
|---|---|---|
| Masticating Conditions (mins./° F.) | none | 10/380 |
| 300% Modulus (p.s.i.) | 500 | 920 |
| Tensile Strength (p.s.i.) | 650 | 1000 |
| Extension at Break (percent) | 850 | 430 |

EXAMPLE 9

A. Ethylene/propylene copolymer:
The ethylene/propylene copolymer of Example 1 was used.

B. Heat treatment and cure:
Six stocks 9A–9F were compounded on a rubber roll mill at a temperature between 75° and 100° F. according to the following recipe:

Ingredient: Parts by weight
Ethylene/propylene copolymer _____ 100
Calcined clay ("Iceberg Pigment") _____ 120
Promoter _____ as shown in table After these stocks had been masticated on a rubber roll mill for 10 minutes at 380° F., they were cooled to 75–100° F. and further compounded thereon at 75–100° F. with 0.2 part of sulfur and 7.5 parts of a mixture containing 40% by weight of dicumyl peroxide and 60% calcium carbonate. A 30-minute cure at 307° F. gave vulcanizates having the following properties at 25° C.:

VULCANIZATE PROPERTIES OF STOCKS MASTICATED AT 380° F.

| Promoter | 9A | 9B | 9C | 9D | 9E | 9F |
|---|---|---|---|---|---|---|
| p-Quinone Dioxime | 0.1 | 0.3 | 0.5 |  |  |  |
| Poly(p-dinitroso-Benzene) |  |  |  | 1 |  |  |
| N,4-dinitroso-N-methylaniline |  |  |  |  | 1 |  |
| Vulcanizate Properties: |  |  |  |  |  |  |
| 300% Modulus (p.s.i.) | 700 | 850 | 900 | 675 | 825 |  |
| Tensile Strength (p.s.i.) | 800 | 850 | 800 | 750 | 875 |  |
| Extension at break (percent) | 520 | 320 | 300 | 50 | 400 |  |

EXAMPLE 10

A. Ethylene/propylene copolymer:
The ethylene/propylene copolymer of Example 1 was used.

B. Heat Treatment and cure:
Two stocks 10A and 10B were compounded on a rubber roll mill at 75–100° F. All contained 100 parts of copolymer and 120 parts of calcined clay ("Iceberg Pigment"). One part of p-quinone dioxime was added to 10B. Stock 10B was heat treated for 10 minutes at 380° F. with 0.2 part of sulfur and 7.5 parts of a mixture of 40% by weight dicumyl peroxide and 60% by weight calcium carbonate and cured at 307° F. for 30 minutes. The vulcanizates obtained display the following properties at 25° C. Stock number 10A is included for comparison.

VULCANIZATE PROPERTIES OF CALCINED CLAY STOCKS

|  | 10A | 10B |
|---|---|---|
| Heat Treated | No | Yes |
| p-Quinone dioxime present | No | Yes |
| 300% Modulus (p.s.i.) | 250 | 875 |
| Tensile Strength (p.s.i.) | 400 | 900 |
| Extension at Break (Percent) | 1,000 | 400 |
| D. C. Resistivity (ohm-cm.) | $1.04 \times 10^{14}$ | $1.4 \times 10^{14}$ |
| Power Factor (Percent) | 0.49 | 0.39 |
| Dielectric Constant | 3.2 | 3.3 |
| D. C. Resistivity* (ohm-cm.) | $1.7 \times 10^{11}$ | $1.3 \times 10^{14}$ |
| Power Factor* (Percent) | 15.4 | 1.1 |
| Dielectric Constant* | 4.6 | 3.3 |

*After 25-mil slabs had been immersed in water at 25° C. for 16 hours.

The vulcanizate properties were determined in accordance with the following procedures:

| | ASTM method |
|---|---|
| Stress-strain | D 412–51T |
| Yerzley resilience | D 945–55 |
| Compression set | D 395–55 |
| D.C. resistivity | D 150 |
| Power factor | D 150 |
| Dielectric constant | D 150 |

As many widely different embodiments of this invention may be made without departing from the spirit and scope thereof, it is to be understood that this invention is not limited to the specific embodiments thereof except as defined in the appended claims.

What is claimed is:

1. In a process for promoting the di(aralkyl) peroxide cure of elastomeric chain-saturated copolymers of alpha-olefin monomers, said copolymer containing clay, the improvement which comprises, in sequence, (1) masticating at about 250° F. to 500° F. (a) about 10 parts by weight of said copolymer, (b) about 20 to 300 parts by weight of a clay selected from the group consisting of kaolin clay and calcined clay and (c) a promoter which when said clay is kaolin clay, said promoter is present in an amount of about 0.5 to 1.5 parts by weight and is selected from the group consisting of p-quinone dioxime, morpholine disulfide and mixtures thereof and when said clay is calcined clay, said promoter is present in an amount of about 0.1 to 1.5 parts by weight and is selected from the group consisting of p-quinone dioxime, morpholine disulfide, nitroso amines where the nitrogen atom bearing the —NO radical has no more than one aromatic substituent, poly(paradinitrosobenzene) and mixtures thereof; (2) introducing about 1 to 10 parts by weight of said di(aralkyl)peroxide per 100 parts by weight of said copolymer and (3) heating at about 266° F. to 410° F. so as to effect a cure.

2. In a process for promoting the di(aralkyl)peroxide cure of elastomeric chain-saturated copolymers of alpha-olefin monomers, said copolymers containing clay, the improvement which comprises, in sequence, (1) masticating at about 250° F. to 500° F. (a) about 100 parts by weight of said copolymer (b) about 0.1 to 1.5 parts by weight of a promoter selected from the group consisting of p-quinone dioxime, morpholine disulfide, nitroso amines where the nitrogen atom bearing the —NO radical has no more than one aromatic substituent, poly(para-dinitrosobenzene) and mixtures thereof; (2) introducing about 1 to 10 parts by weight of said di(aralkyl) peroxide per 100 parts by weight of said copolymer and about 20 to 300 parts by weight of calcined clay; and (3) heating at about 266° F. to 410° F. so as to effect a cure.

3. In a process for promoting the di(aralkyl)peroxide cure of elastomeric chain-saturated copolymers of alpha-olefin monomers, said copolymers containing clay, the improvement which comprises, in sequence, (1) masticating at about 250° F. to 500° F. (a) about 100 parts by weight of said copolymer (b) about 20 to 300 parts by weight of calcined clay and (c) about 0.1 to 1.5 parts by weight of a promoter selected from the group consisting of p-quinone dioxime, morpholine disulfide, nitroso amines where the nitrogen atoms bearing the —NO radical has no more than one aromatic substituent, poly(para-dinitrosobenzene) and mixtures thereof; (2) introducing about 1 to 10 parts by weight of said di(aralkyl) peroxide per 100 parts by weight of said copolymer; (3) and heating to about 266° F. to 410° F. so as to effect a cure.

4. A process as described in claim 3 where about 1 part by weight of said promoter is employed.

5. A process as described in claim 3 where said promoter is p-quinone dioxime.

6. A process as described in claim 3 where said peroxide is dicumyl peroxide.

7. A process as defined in claim 3 where the temperature of said masticating is about 380° F.

8. A process as defined in claim 3 where said copolymer is the ethylene/propylene copolymer.

9. A process as defined in claim 3 where said di(aralkyl)peroxide is introduced after said masticated copolymer, promoter and clay has cooled to about 75° F. to 100° F.

10. In a process for promoting the di(aralkyl)peroxide cure of elastomeric chain-saturated copolymers of alpha-olefin monomers, said copolymers containing clay, the improvement which comprises, in sequence, (1) masticating at about 250° F. to 500° F. (a) about 100 parts by weight of said copolymer, (b) about 0.5 to 1.5 parts by weight of a promoter selected from the group consisting of p-quinone dioxime, morpholine disulfide and mixtures thereof and (c) about 20–300 parts by weight of kaolin clay; (2) introducing about 1 to 10 parts by weight of said di(aralkyl)peroxide per 100 parts by weight of said copolymer; and (3) heating at about 266° F. to 410° F. so as to effect a cure.

11. A process as described in claim 10 where said promoter is p-quinone dioxime.

12. A process as described in claim 10 where said kaolin clay is present in about 120 parts by weight.

13. A process as described in claim 10 where said copolymer is the ethylene/propylene copolymer.

14. A process as defined in claim 10 where about 1 part by weight of said promoter is employed.

15. A process as defined in claim 10 where the temperature of said masticating is about 300° F. to 450° F.

16. A process as defined in claim 10 where said peroxide is dicumyl peroxide.

17. A process as defined in claim 10 where said di(aralkyl)peroxide is introduced after said masticated copolymer, promoter and clay has been cooled to about 75° F. to 100° F.

18. In a process for promoting the di(aralkyl)peroxide cure of elastomeric chain-saturated copolymers of alpha-olefin monomers, said copolymers containing clay, the improvement which comprises, in sequence, (1) mixing at a temperature of about 75° F. to 150° F. (a) about 100 parts by weight of said copolymer (b) about 20 to 300 parts by weight of a clay selected from the group consisting of a kaolin clay and calcined clay and (c) a promoter which when said clay is kaolin clay said promoter is present in an amount of about 0.5 to 1.5 parts by weight and is selected from the group consisting of p-quinone dioxime, morpholine disulfide and mixtures thereof and when said clay is calcined clay said promoter is present in an amount of about 0.1 to 1.5 parts by weight and is selected from the group consisting of p-quinone dioxime, morpholine disulfide, nitroso amines where the nitrogen atom bearing the —NO radical has no more than one aromatic substituent, poly(para-dinitrosobenzene) and mixtures thereof (2) masticating at about 250° F. to 500° F. said copolymer containing said clay and said promoter; (3) introducing about 1 to 10 parts by weight of said di(aralkyl) peroxide per 100 parts by weight of said copolymer; and (4) heating at about 266° F. to 410° F. so as to effect a cure.

19. In a process for promoting the dicumyl peroxide cure of elastomeric ethylene/propylene copolymers containing calcined clay, the improvement which comprises, in sequence, (1) mixing at about 75° F. to 100° F. (a) about 100 parts by weight of said copolymer (b) about 120 parts by weight of said calcined clay and (c) about one part by weight of p-quinone dioxime; (2) masticating at about 380° F. said mixture; (3) introducing about 2 to 5 parts by weight of said dicumyl peroxide per 100 parts by weight of said copolymer after said mixture has been cooled to 75° F. to 100° F.; and (4) heating said mixture to about 266° F. to 410° F. so as to effect a cure.

20. In a process for promoting the dicumyl peroxide cure of elastomeric ethylene/propylene copolymers containing kaolin clay, the improvement which comprises, in sequence, (1) mixing at about 75° F. to 100° F. (a)

about 100 parts by weight of said copolymer (b) about 120 parts by weight of said kaolin clay and (c) about one part by weight of p-quinone dioxime; (2) masticating at about 380° F. said mixture; (3) introducing about 2 to 5 parts by weight of said dicumyl peroxide per 100 parts by weight of said copolymer after said mixture has been cooled to 75° F. to 100° F.; and (4) heating said mixture to about 266° F. to 410° F. so as to effect a cure.

References Cited by the Examiner

UNITED STATES PATENTS 3,012,020   12/1961   Kirk et al. _____ 260—41

FOREIGN PATENTS 217,890   11/1957   Australia.

MORRIS LIEBMAN, *Primary Examiner.*